PHASE DETECTOR

Filed Nov. 26, 1952 2 Sheets-Sheet 1

INVENTOR.
Kurt Schlesinger
BY
Norman L. Mueller
Atty.

PHASE DETECTOR

Filed Nov. 26, 1952 2 Sheets-Sheet 2

INVENTOR.
Kurt Schlesinger
BY Norman L. Mueller
Atty.

United States Patent Office 2,718,546

Patented Sept. 20, 1955

2,718,546

PHASE DETECTOR

Kurt Schlesinger, Maywood, Ill., assignor to Motorola, Inc., Chicago, Ill., a corporation of Illinois Application November 26, 1952, Serial No. 322,763

10 Claims. (Cl. 178—5.4)

Figure 1:
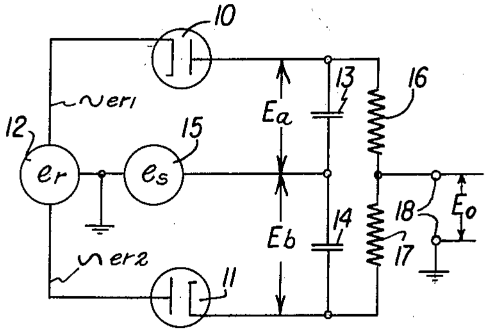

This invention relates generally to circuits for producing a signal having an amplitude related to the phase relation between a pair of signals applied thereto, and more particularly to a network that may be utilized to recover the modulation components of a selected one of two amplitude modulated signals applied thereto in response to a reference voltage applied to the network having the same frequency and phase as the selected modulated signal.

One application of the improved phase detector network of the invention is in a color television system in which color information is transmitted on one or more subcarriers as in the NTSC type of color television system. The NTSC color system is described in an article by C. J. Hirsch et al., entitled "Principles of NTSC compatible color television" at page 88 of Electronics Magazine, published by McGraw-Hill Corporation, in the February 1952 edition. In this type of color television system, it is usual to produce a series of "color difference" signals each containing different color information. Two independent signals each representing different color-difference information are usually modulated on two subcarrier components having the same frequency but being in quadrature phase with each other.

The two independent modulation products of the subcarrier components referred to above may be recovered in the receiver portions of the system by utilizing a pair of phase detector networks each constructed in accordance with the present invention. The modulated subcarriers are impressed on both of the phase detectors. A reference voltage having the frequency and phase of one of the subcarrier components is developed at the receiver and impressed on one of the detectors, to cause that detector to recover only the modulation products of the last mentioned subcarrier component. In addition, a second reference voltage is developed at the receiver with the same frequency as the first reference voltage but in phase quadrature therewith to have the frequency and phase of the other subcarrier component, and the second reference voltage is applied to the other detector causing it to recover only the modulation products of the other subcarrier component.

Another application of the phase detector of this invention is to monitor the subcarrier components in the NTSC transmitter to assure that they are in phase quadrature for the proper operation of the system. This monitoring is complicated by the fact that in accordance with NTSC color principles one of the subcarrier components is reversed in phase during alternate fields of each frame of the color television signal to avoid cross talk. For this purpose the phase detector of this invention may be constructed to monitor a quadrature phase relationship between two vectors, one of which alternates from +90° to −90° every other field of each frame of the color television signal.

Yet another application of the invention is in the recently devised color television system, referred to as the "orange-cyan" or "I-Q" color system, to recover at the color television receivers desired color difference signals from received chrominance information.

More generally, however, the phase detector of this invention is so constructed that it may be utilized whenever it is desired to obtain a control signal having an amplitude determined by the phase relation between a pair of signals applied to the detector.

It is, accordingly, an object of the present invention to provide an improved phase detector network capable of developing an indication of the phase relation between a pair of signals applied thereto.

A more particular object of the invention is to provide an improved phase detector network which is capable of demodulating an amplitude modulated signal applied thereto and produce its modulation component in response to a reference voltage of the same frequency and phase as the modulated signal.

A still further object of the invention is to provide an improved phase detector network which is capable of demodulating a selected one of a pair of amplitude modulated signals applied thereto, such demodulation being accomplished in response to a reference voltage having the frequency and phase of the selected signal.

Yet another object of the invention is the provision of such an improved phase detector network which is extremely simple in construction and requires few and relatively inexpensive component parts.

A feature of the present invention is the provision of such an improved phase detector network in which the reference voltage cancels itself in the output circuit, so that amplitude variations of this voltage have no effect on the output signal out of the detector.

Another feature of the invention is the provision of such an improved phase detector which reproduces the modulation components of the signal demodulated thereby, but does not introduce any D. C. bias of its own, which greatly facilitates the utilization of the demodulated components by succeeding stages of the receiver.

Another feature of the invention is the provision of such an improved phase detector that utilizes a pair of simple and inexpensive diodes to accomplish its intended purposes.

Figure 2:
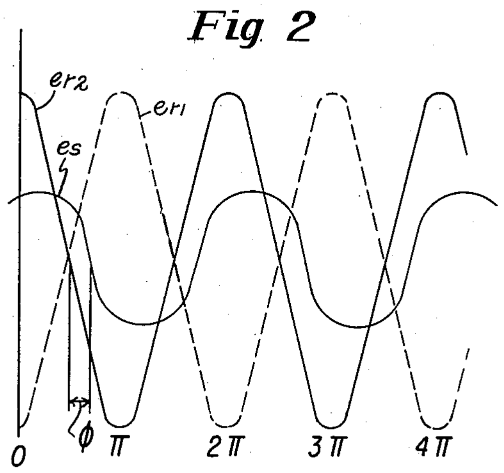
Figure 3:
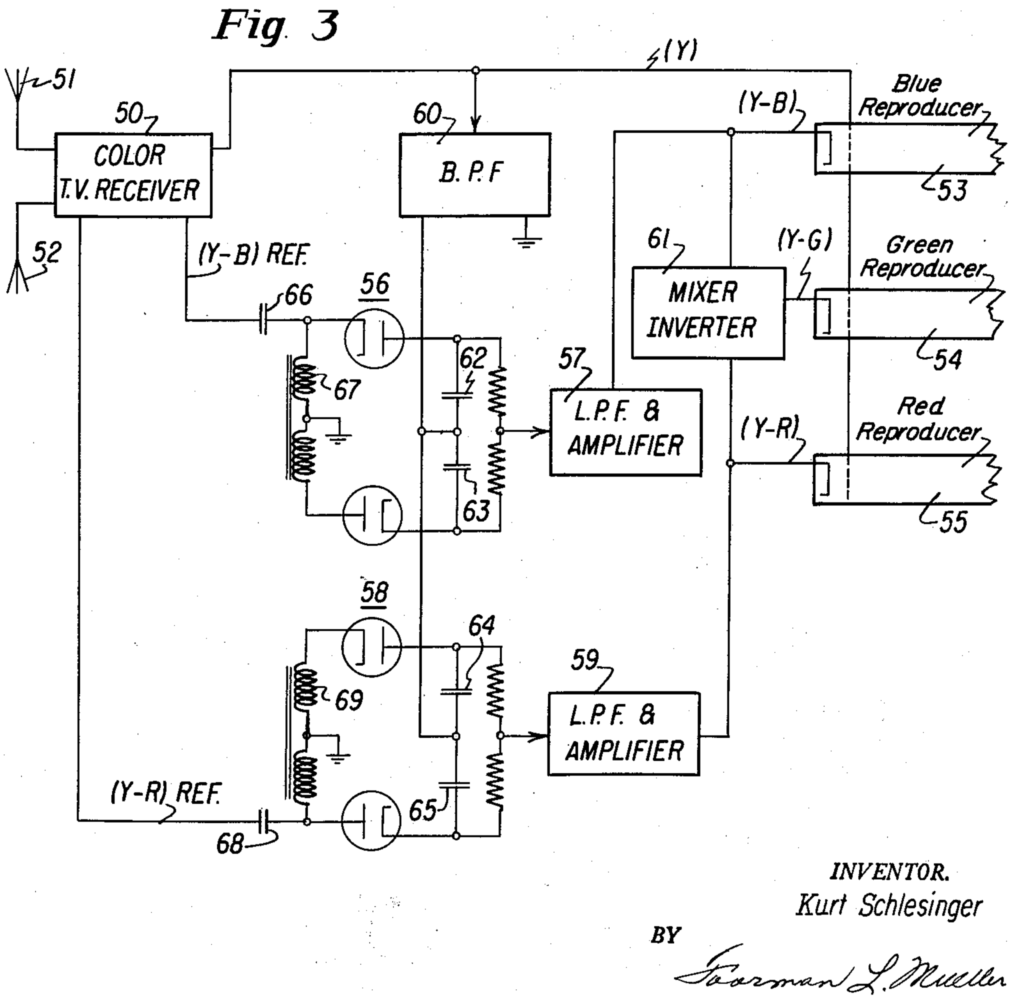
Figure 4A:
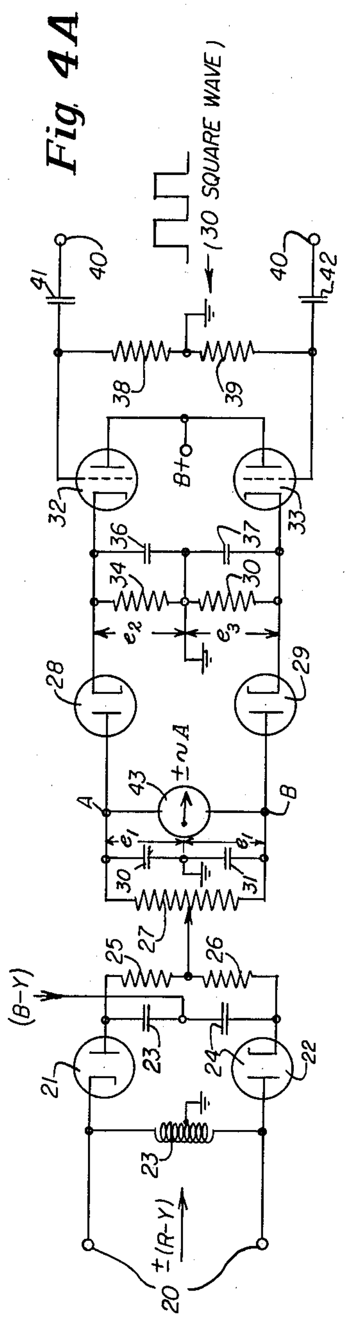
Figure 5:
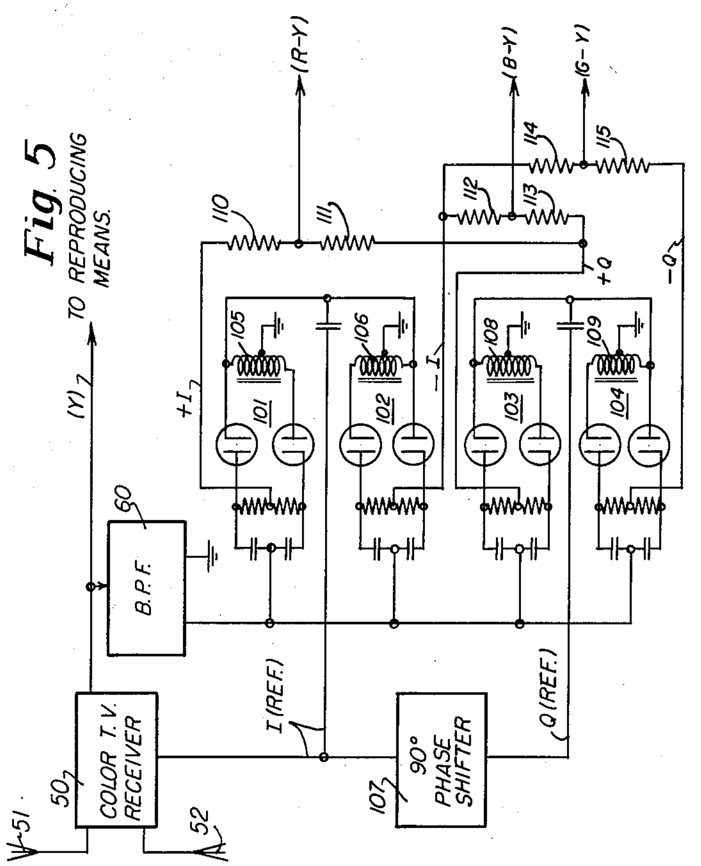
Figure 4B:
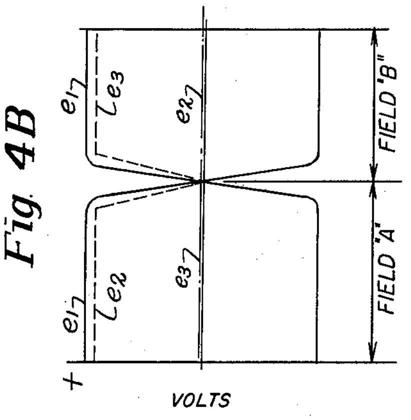

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 is a circuit diagram of one embodiment of the phase detector of the invention, Fig. 2 shows various curves useful in explaining the operation of the invention, Fig. 3 is a schematic representation of a color television receiver of the NTSC type incorporating the invention, Fig. 4A shows a modified circuit of the invention to render the invention suitable for monitoring voltages developed in the NTSC type of color television transmitter, Fig. 4B are curves useful in understanding the operation of the circuit of Fig. 4A, and Fig. 5 is a schematic representation of a color television receiver of the "I-Q" or "orange-cyan" type incorporating the invention.

The phase detector network of the invention includes in combination a pair of switching devices, which may be a pair of diodes, having an output circuit connected thereto. An input circuit is provided for impressing a reference signal on the devices to close the devices at times corresponding to the peaks of selected half-cycles of the reference signal and cause the devices respectively to translate with opposite polarity to the output circuit a pair of potentials corresponding to the amplitude of such peaks and which cancel in the output circuit. A further input circuit is provided for applying a second signal to the devices which are sampled during the intervals when the devices are closed by the aforementioned peaks of the reference signal to cause a pair of potentials to be translated thereby with like polarity to the output circuit only during such intervals. The last mentioned potentials combine in the output circuit to produce an output signal having an amplitude related to the amplitude of the second signal and to the phase relation between the second signal and reference signal.

With reference now to Figs. 1 and 2 of the drawing, the improved phase detector of the invention includes a pair of diodes 10 and 11 or other suitable switching devices. A reference voltage source 12 is connected to the cathode of device 10, and to the anode of device 11 and to a point of reference potential, or ground. Source 12 supplies to the respective diodes, in response to a sine-wave reference signal $e_r$, a pair of equal amplitude, oppositely phased, sine-wave reference signals $e_{r1}$ and $e_{r2}$, respectively in-phase and in phase opposition to $e_r$. The oppositely phased reference signals have positive and negative half-cycles with respect to reference potential or ground. The network also includes a pair of series-connected capacitors 13 and 14 of equal value which are connected from the anode of device 10 to the cathode of device 11. A source 15 is connected to the point of reference potential, or ground, and to the junction of capacitors 13 and 14; and that source impresses a sine wave signal $e_s$ between the last mentioned junction and ground. Capacitors 13 and 14 are shunted by a pair of series-connected resistors 16 and 17 of equal value, the junction of these resistors being connected to one of the output terminals 18, and the other output terminal being connected to the reference potential or ground point.

Neglecting for the moment the effect of the signal $e_s$, and assuming that source 15 constitutes a path to ground from the junction of capacitors 13 and 14; the negative half-cycles of signal $e_{r1}$ cause device 10 to be conductive so that a current flows through capacitor 13 charging that capacitor. This causes capacitor 13 to bias device 10 so that the device is conductive only at the peaks of the negative half-cycles of the signal $e_{r1}$. On the other hand, the positive half-cycles of the signal $e_{r2}$ cause device 11 to become conductive charging capacitor 14, and this causes capacitor 14 to bias diode 11 so that it is conductive only at the peaks of such positive half-cycles. In this fashion, a negative potential is developed across capacitor 13 having an amplitude related to the amplitude of the negative peaks of the signal $e_{r1}$, and a positive potential is developed across capacitor 14 having an amplitude corresponding to the positive peaks of the signal $e_{r2}$. Since $e_{r1}$ and $e_{r2}$ have the same amplitude, and since capacitors 13 and 14 have the same value, these two potentials have equal amplitudes, and are of opposite polarity. In this manner capacitor 13 represents a source of voltage which is minus with respect to ground for $e_r$, and capacitor 14 represents a source of equal voltage which is positive with respect to ground for $e_r$ so that these voltages cancel across output terminals 18.

Now if a signal $e_s$ is impressed between the junction of capacitors 13 and 14 and ground, and if this signal has an amplitude substantially less than the amplitude of the oppositely phased signals $e_{r1}$ and $e_{r2}$, for example, if the reference signal $e_{r2}$ has an amplitude of more than double the amplitude of the signal $e_3$ as shown by the curves in Fig. 2; the signal $e_s$ is effectively sampled by both the diodes during the intervals when the diodes are rendered conductive by the aforementioned peaks of the reference signals $e_{r1}$ and $e_{r2}$. In this fashion, capacitors 13 and 14 are charged by the signal $e_s$ an amount corresponding to the amplitude of that signal at the precise moment when the diodes are rendered conductive and the signal is sampled. In other words, if $e_s$ is of the same frequency and phase as $e_r$, it will have maximum positive amplitude during the intervals when the oppositely phased signals $e_{r1}$ and $e_{r2}$ render the devices conductive, so that positive potentials corresponding to the maximum amplitude of $e_s$ appear across capacitors 13 and 14. If, on the other hand, $e_s$ is in phase opposition with $e_r$, it will have maximum negative amplitude when the diodes are rendered conductive so that negative potentials corresponding to the maximum amplitude of $e_s$ are developed across the capacitors. Any phase shift between $e_s$ and $e_r$ causes diodes 10 and 11 to be conductive at times when $e_s$ has not reached positive or negative maximum amplitude, so that the potentials developed across the capacitors are correspondingly less, dropping to zero when $e_s$ is in phase quadrature with $e_r$.

The potentials developed across capacitors 13 and 14 by the sampled portions of $e_s$ when the diodes are conductive, unlike the potentials developed thereacross by $e_{r1}$ and $e_{r2}$, are of the same polarity. Therefore, with respect to the signal $e_s$, capacitors 13 and 14 constitute a pair of positive potential sources (or a pair of negative potential sources) effectively in parallel insofar as output terminals 18 are concerned, so that a potential is developed across the output terminals having an amplitude corresponding to the amplitude of $e_s$ at the moments it is sampled by the diodes, this potential being positive or negative depending upon which half-cycles of $e_s$ are so sampled. It is to be noted that the output signal developed across terminals 18 has no D. C. bias due to the detector as is the case when triode or other control grid detectors are used, and coupling of the detector to other stages is greatly facilitated.

Assuming now that $e_s$ is amplitude modulated, and $e_r$ has the same frequency and phase as the modulated signal; under these conditions, devices 10 and 11 are rendered conductive by the oppositely phased signals $e_{r1}$ and $e_{r2}$ at times corresponding to the positive peaks of the modulated signal $e_s$ so that a potential having an amplitude corresponding to the amplitude of the positive peaks of signal $e_s$ is developed across output terminals 18. Any variation in the amplitude of the signal $e_s$ due to its modulation components causes, therefore, a corresponding variation in the signal appearing across output terminals 18. The detector, therefore, recovers across output terminals 18 the modulation components of signal $e_s$ but, as previously noted, the potentials due to the reference voltage cancels across these output terminals so that variations in the reference voltage have no effect on the output signal. It is to be noted, that should another modulated signal $e'_s$ also be impressed between the junction of capacitors 13, 14 and ground, together with the signal $e_s$ and having the same frequency but in phase quadrature therewith, the modulation components of the signal $e'_s$ do not appear across capacitors 13 and 14 since diodes 10 and 11 are rendered conductive by the oppositely phased signals $e_{r1}$ and $e_{r2}$ at the precise time that the signal $e'_s$ is passing through zero axis and has no amplitude.

The previously discussed action of the phase detector of Fig. 1 may be developed mathematically in the following fashion:

The reference signal $E_r$ is split, as shown in Fig. 2, into a pair of oppositely phased signals having respective instantaneous amplitudes $e_{r1}$ and $e_{r2}$, and average values $E_{r1}$ and $E_{r2}$. $E_{r1}$ is in phase with $E_r$, $E_{r2}$ is 180° out of phase with $E_r$, and $E_{r1}$ and $E_{r2}$ are equal in amplitude to $E_r$. The second signal has an instantaneous value $e_s$ and an average value $E_s$. $E_s$ is of smaller amplitude than $E_r$ and lagging in phase by an angle $\phi$.

Therefore, $$e_r = E_r \cos wt \quad (1)$$

$$e_s = E_s(\cos wt - \phi) \quad (2)$$

$$= E_s(\cos wt \cos \phi + \sin wt \sin \phi) \quad (3)$$

As shown in Fig. 2, diode 10 is opened by $e_{r1}$ and diode 11 is opened by $e_{r2}$ at times when $wt=0, 2\pi, 4\pi$, etc.; and when $e_{r1} = -E_{r1}(\max)$ and $e_{r2} = +E_{r2}(\max)$. At these times:

$$e_s = E_s(1 \times \cos \phi + 0) \text{ (from Equation 3)} \quad (4)$$

$$= E_s \cos \phi \quad (5)$$

Therefore: the voltage across capacitor 13, $$|E_a| = |E_s \cos \phi| - |E_{r1}| \quad (6)$$

the voltage across capacitor 14, $$|E_b| = |E_s \cos \phi| + |E_{r2}| \quad (7)$$

and the voltage across output terminals 18, $$|E_0| = \tfrac{1}{2}(|E_a| + |E_b|) \quad (8)$$

$$= E_s \cos \phi \text{ (from Equations 6 and 7)}$$

Thus:

$E_0$ is independent of $E_r$ $E_0$ is maximum when $\phi=0$ or 180° (e. g., when $E_s$ and $E_r$ are in phase or in phase opposition)

$E_0$ is zero when $\phi=90°$ (e. g., when $E_s$ and $E_r$ are in phase quadrature)

$e_s$ is rectified and its amplitude modulation, therefore, appears across the output terminals.

As previously mentioned, the color television receiver shown schematically in Fig. 3 is of the NTSC type and the major portion of the receiver is shown by the block 50 which is connected to a suitable antenna 51, 52. Block 50 is also connected to the control electrodes of image reproducers 53, 54 and 55. The reproducers may be of the cathode-ray type, reproducer 53 producing the blue image, reproducer 54 the green image, and reproducer 55 the red image. The various reproduced color images can be combined optically in well known fashion to synthesize full color reproduction. It is also evident that the various reproducers 53, 54 and 55 may be combined in a single envelope in accordance with well established practices.

Unit 50 is also coupled to a phase detector 56, which is constructed in accordance with the teaching of Fig. 1, and its output terminals are connected through a low-pass filter and amplifier 57 (which may contain suitable peaking networks) to the cathode of blue image reproducer 53. Unit 50 is also connected to a phase detector 58 constructed in accordance with the teaching of Fig. 1, the latter detector having output terminals connected through a low-pass filter 59 (which also may contain suitable peaking networks) to the cathode of red image reproducer 55. Unit 50 is also connected to detectors 56 and 58 through a band-pass filter 60. The cathode of device 55 and the cathode of device 53 are connected to a mixer inverter 61 which, in turn, is connected to the cathode of green reproducer 54.

As fully described in the previously mentioned article, the NTSC color television signal has monochrome information ($y$) modulated on a main carrier wave, and color information modulated on a pair of subcarriers which have the same frequency but are in phase quadrature and which are modulated on the main carrier. The color information takes the form of a pair of blue and red color difference signals ($y-b$) and ($y-r$) which are respectively modulated on the subcarriers.

The above mentioned type of color television signal is intercepted by the antennas 51 and 52 and utilized by the receiver 50 to produce a detected composite video signal ($y$) representing the monochrome values of the televised scene, the video signal being impressed on the respective control electrodes of reproducers 53, 54 and 55. The composite video signal also contains the two subcarriers which, as previously mentioned, have the same frequency but are in phase quadrature and which are respectively modulated by the ($y-b$) and ($y-r$) color information. These subcarriers are translated by band-pass filter 60 and impressed between the junction of capacitors 62 and 63 of detector 56 and ground, and between the junction of capacitors 64 and 65 of detector 58 and ground.

The receiver 50 also develops in known fashion a reference signal having the frequency and phase of the ($y-b$) subcarrier, and this reference signal is supplied to one side of a center-tapped inductance coil 67 of detector 56 through a coupling capacitor 66 to produce a pair of oppositely phased ($y-b$) reference signals across the inductance coil whose center tap is grounded.

In the previously described fashion, detector 56 responds to the ($y-b$) reference signal from the receiver and to the in-phase ($y-b$) subcarrier to produce the modulation components of that subcarrier, these modulation components being supplied to the cathode of reproducer 53 through low-pass filter 57. In this manner, the control electrode of reproducer 53 is modulated in accordance with the monochrome ($y$) components, and its cathode is modulated in accordance with the ($y-b$) color difference modulation components, so that the net modulation on the cathode-ray beam in this device is in accordance with the blue color information. It is to be noted that the ($y-r$) subcarrier is also supplied to detector 56, but since it is in phase quadrature with the ($y-b$) reference signal supplied to the detector, its modulation components do not appear at the output terminals of that detector.

It is usual practice in NTSC color television systems to reverse the phase of the ($y-r$) subcarrier from time to time to prevent cross talk and, in well known fashion, receiver 50 supplies a ($y-r$) reference signal to detector 58 through coupling capacitor 68 having the phase and frequency of the ($y-r$) subcarrier and whose phase is reversed in time coincidence with the phase reversals of that subcarrier. The two subcarriers from band-pass filter 60 are also supplied, as previously mentioned, to detector 58, but the latter detector produces only the modulation components of the ($y-r$) subcarrier since the ($y-b$) subcarrier is in phase quadrature with the $\pm(y-r)$ reference signal. The ($y-r$) modulation components from detector 58 are supplied through low-pass filter 59 to the cathode of image reproducer 55. Since the control electrode of reproducer 55 is modulated by the monochrome ($y$) components and its cathode is modulated by the ($y-r$) modulation components, the net modulation of the cathode-ray beam in the reproducer is in accordance with the red color information.

The ($y-b$) components supplied to device 53, and the ($y-r$) components supplied to device 55 are mixed in unit 61 in well known fashion (described in the aforementioned article) to produce the green color difference components ($y-g$). The latter components are impressed on the cathode of reproducer 54 so that the resulting modulation of the cathode-ray beam therein is in accordance with the green color information. In this fashion, device 53 reproduces the blue information, device 54 the green information and device 55 the red information so that a full color image of the televised scene may be obtained.

It is evident, however, that the use of the improved detector circuit of the invention is not limited to such a color television system but may find application whereever it is desired to develop a signal having amplitude variations corresponding to phase variations between a pair of applied signals; or wherever it is desired to separate a selected modulated signal from a plurality of other modulated signals and recover its modulation components, the latter being achieved merely by applying a reference voltage having the frequency and phase of the selected signal to the detector.

In the NTSC type of color television system it is usual to reverse the phase of the $(r-y)$ subcarrier during the second field of each frame of the color television signal to prevent cross talk, as pointed out in the article referred to previously herein. For this purpose, it is necessary to generate at the transmitter the $\pm(r-y)$ subcarrier component and the $(b-y)$ subcarrier component of the same frequency but in phase quadrature therewith. It is important that the $\pm(r-y)$ subcarrier component and the $(b-y)$ subcarrier component be maintained in phase quadrature, and the phase detector of this invention may be utilized in the circuit of Fig. 4A to achieve this purpose. The additional components of the circuit are required since it is desired not merely to compare the phase between two subcarrier components, but to compare the phase between a subcarrier component and a second subcarrier component having a phase reversal from time to time.

The circuit of Fig. 4A includes a pair of input terminals 20 connected respectively to the cathode of diode 21 and to the anode of diode 22, and shunted by a bi-filar coil 23 whose center tap is connected to ground. The anode of diode 21 is coupled to the cathode of diode 22 through a pair of series-connected capacitors 23 and 24 which are shunted by a pair of series-connected resistors 25 and 26.

The $\pm(r-y)$ subcarrier component is impressed across input terminals 20, and the $(b-y)$ subcarrier component is applied to the junction of capacitors 23 and 24. The circuit thus far described is similar to the phase detector networks previously discussed herein, and from the previous discussion it is evident that so long as the $(r-y)$ subcarrier component and $(b-y)$ subcarrier components are in phase quadrature, no output is derived from the phase detector. However, should the phase relation between the $\pm(r-y)$ subcarrier component and the $(b-y)$ subcarrier component be other than 90°, an output signal appears between the junction of resistor 25 and 26 and ground. This output signal is positive during the first field of each frame of the color television signal and negative during the second field if the phase deviation from 90° is in one sense, and is negative during the first field and positive during the second field if the phase deviation is in the other sense. Since the output signal from the phase detector reverses its polarity during alternate fields, it is evident that the net output signal is zero regardless of the phase relation between the subcarrier components. For this reason, additional circuitry is necessary so that an indication of the amount and sense of the phase deviation may be obtained.

To achieve the above purpose, the junction of resistors 25 and 26 is connected to a movable tap on resistor 27 connected across the anodes of additional diodes 28 and 29, and shunted by a pair of series-connected capacitors 30 and 31 whose junction is connected to ground. The cathodes of diodes 28 and 29 are connected to the cathodes of a pair of triodes 32 and 33, and are shunted by a pair of series resistors 34 and 35 and by a pair of series-connected capacitors 36 and 37, the junction of resistors 34 and 35 and capacitors 36 and 37 being connected to ground. The anodes of diodes 32 and 33 are connected to the positive terminal B+ of a source of unidirectional potential, and their control electrodes are connected respectively to ground through grid leak resistors 38 and 39. The circuit has a further pair of input terminals 40 which are connected respectively to the control electrodes of triodes 32 and 33 through coupling capacitors 41 and 42.

A square wave is derived at the transmitter by any known means having, for example, positive half-cycles during the first field of each frame of the color television signal and having negative half-cycles during the second field of each frame of the color signal. This square wave is impressed on input terminals 40 and applied in push-pull to triodes 32 and 33. In this fashion, and as shown in Fig. 4B, a voltage $e_2$ is developed across resistor 34 connecting the cathode of triode 32 to ground during the first field, and a voltage $e_3$ is developed across resistor 35 connecting the cathode of triode 33 to ground during the second field. This causes diode 28 to be cut off during the first field with diode 29 establishing a path to ground through resistor 35, and causes diode 29 to be cut off during the second field with diode 28 establishing a path to ground through resistor 34.

Now, should the phase relation between the $\pm(r-y)$ subcarrier component and the $(b-y)$ subcarrier component deviate so that an output signal having a positive polarity during the first field of each frame of the color television signal and a negative polarity during the second field is developed by the phase detector, a positive voltage $e_1$ (Fig. 4B) is established across capacitor 30 and a like positive voltage $e_1$ is established across capacitor 31. During the first field, as previously mentioned, device 28 is cut off but device 29 establishes a path to ground, therefore, capacitor 31 discharges directly through diode 29 whereas capacitor 30, unable to discharge through diode 28, discharges through a micro-ammeter 43 with a current flow from A to B and through diode 29 so that meter 43 is deflected in a particular direction, and by an amount depending upon the amplitude of the signal developed by the phase detector which, in turn, depends upon the amount of deviation between the subcarrier components. During the second field of each frame of the color television signal, the signal developed by the circuit of diodes 21, 22 becomes negative so that a negative potential $e_1$ is developed across each of the capacitors 30 and 31 rendering the anodes of diodes 28 and 29 negative so that no current flows through the micro-ammeter 43.

Should the phase deviation between the subcarrier components be in the other sense, a negative potential is developed by the circuit of diodes 21, 22 and appears across each of the capacitors 30 and 31 during the first field of each frame of the color television signal driving the anodes of diodes 28 and 29 negative so that there is no current flow through the micro-ammeter 43. However, during the second field, the potentials across capacitor 30 and capacitor 31 are both positive and, at this time, diode 28 is conductive and diode 29 cut off. Therefore, the charge on capacitor 33 leaks off through diode 28 directly, and the charge across capacitor 31 leaks through the microammeter 43 and diode 28, since diode 29 is cut off. Therefore, the current flow through the micro-ammeter is in a direction from B to A and the micro-ammeter is deflected in the opposite direction and by an amount corresponding to the amount of phase deviation between the subcarrier components.

Tap 27 is adjusted so that micro-ammeter has a selected zero position when the subcarrier components are in phase quadrature and the circuit of Fig. 4 may be used as a simple and efficient monitor which indicates at a glance any phase deviation between the subcarrier components, the amount of such deviation, and the sense of such deviation.

In an effort to reduce the complications that have resulted in the NTSC color television system due to the necessity of inverting the phase of the $(r-y)$ subcarrier, a somewhat similar system has been devised but which does not require such phase reversal and which is referred to generally as the "orange-cyan" system. This system is different from the present NTSC system in that instead of modulating $(b-y)$ and $(r-y)$ chrominance information on the subcarrier components, "I" chrominance information and "Q" chrominance information having a selected relation to the *b*, *r* and *g* chrominance information of the NTSC system are modulated on the subcarrier components. The arrangement is such that satisfactory color reproduction can be obtained without the necessity of reversing the phase of one of the subcarrier components. It is necessary at the receiver to convert the "I" and "Q" chrominance information into $(g-y)$, $(r-y)$ and $(b-y)$ color information for application to the reproducing means, and the phase detector of this invention is well suited for use in such a system for effectuating this conversion in a simple and expedient manner. A receiver for operation in the color television system described above, and which incorporates the phase detector of the invention, is shown in Fig. 5.

The receiver of Fig. 5, like that of Fig. 3, includes the usual color television receiver components indicated by the block 50 having input terminals connected to an antenna 51, 52. Unit 50 supplies the "y" information to the image reproducing means and supplies the chrominance modulated subcarrier components through bandpass filter 60 to a series of phase detectors 101, 102, 103 and 104 constructed in accordance with the invention. As previously stated, the color television signal includes a first subcarrier component modulated in accordance with "I" chrominance information and a second subcarrier component of the same frequency but in phase quadrature therewith modulated in accordance with "Q" chrominance information, and the two subcarrier components are supplied to the phase detectors by the bandpass filter.

The color television signal also includes bursts of a reference wave having the frequency and phase of the "I" subcarrier component, and these bursts are transformed in known manner into a continuous wave of the same frequency and phase as the "I" subcarrier component in unit 50. The "I" reference wave from unit 50 is supplied to phase detectors 101 and 102 to demodulate the "I" information from the "I" subcarrier component in the manner previously described herein. As shown in Fig. 5, the "I" reference wave is supplied to the top of inductance coil 105 of detector 101 and to the bottom of inductance coil 106 of detector 102, so that it may be in phase with the "I" subcarrier in detector 101 and the phase opposition with the "I" subcarrier in detector 102. For this reason, detector 101 recovers the "I" modulation components with positive polarity, whereas detector 102 recovers the "I" modulation component with negative polarity.

The "I" reference phase from unit 50 is phase shifted 90° by phrase shifter 107 of known construction, to produce a reference signal in phase quadrature with the "I" reference and, therefore, in phase with the "Q" subcarrier, the latter signal being designated the "Q" reference signal. The "Q" reference signal is supplied to the top of inductance coil 108 of detector 103 and to the bottom of inductance coil 109 of detector 104. Detector 103 therefore recovers the "Q" modulation components with positive polarity, and detector 104 recovers the "Q" modulation components with negative polarity.

In accordance with the standards selected in the "orange-cyan" system, the relation between the "I" and "Q" modulation components and the color difference modulation components utilized in the usual NTSC system are as follows:

$$(b-y)=-C_1I+C_2Q$$
$$(g-y)=-C_3I-C_4Q$$
$$(r-y)=+C_5I+C_6Q$$
($C_1$–$C_6$ are constants)

To obtain the appropriate color difference modulation components for application to the image reproducing means, it is merely necessary to mix the modulation components recovered by phase detectors 101—104 in the proper proportion, and this may be achieved by simple resistor mixing, the various resistors having the appropriate values corresponding to the selected constants. For this purpose, the +I modulation components from detector 101 are mixed with the +Q modulation components from detector 103 by means of resistors 110 and 111 to obtain the $(r-y)$ color difference signal. Similarly, the —I modulation components from detector 102 are mixed with the +Q modulation components from detector 103 in proper proportion through resistors 112 and 113 to obtain the $(b-y)$ modulation components. Finally, the —I modulation components from detector 102 are mixed with the —Q modulation components from detector 104 through resistors 114 and 115 to obtain the $(g-y)$ modulation components.

A feature of the network of Fig. 5, apart from its inherent simplicity, is the fact that the "I" and "Q" modulation components are obtained with positive and negative polarity without the introduction of a D. C. bias which, as is well known, arises when triodes or pentagrid detectors are used and which adds greatly to the complication and reduces the efficiency of the circuit.

The invention provides, therefore, an extremely simple and efficient detector circuit that has a wide application and which achieves its desired purpose in a simple, expedient and efficient fashion. The detector of the invention is so constructed that the amplitude of the reference voltage need not be maintained at a rigidly invariable level since such amplitude variations of the reference voltage are not reflected in the output circuit of the detector. Moreover, the detector recovers the modulation components of the respective subcarrier components without introducing any D. C. bias so as to add greatly to the simplicity of the various circuits in which it may be used.

While particular embodiments of the invention have been shown and described, modifications may be made, and it is intended in the appended claims to cover all such modifications as fall within the true spirit and scope of the invention.

I claim:

1. In a color television receiver for utilizing a color television signal having a first subcarrier component modulated in accordance with selected color information and a second subcarrier component modulated in accordance with different color information, said first and second subcarrier components having the same frequency and being in phase quadrature, a network including in combination, a first pair of detector circuits responsive to a reference voltage of the frequency and phase of the first subcarrier component for recovering the modulation products of the first subcarrier component respectively with positive and negative polarity, a second pair of detector circuits responsive to a second reference voltage of the frequency and phase of the second subcarrier component for recovering the modulation products of the second subcarrier component respectively with positive and negative polarity, means for impressing the modulated subcarrier components on said pairs of detector circuits, and an impedance network connected to said pairs of detector circuits for combining the recovered modulation products of the subcarrier components with selected polarities and in selected proportions to produce a plurality of selected color signals.

2. In a color television receiver for utilizing a modulated color television wave having a first subcarrier component amplitude modulated in accordance with selected color information and a second subcarrier component amplitude modulated in accordance with different color information, said first and second subcarrier components having the same frequency and being in phase quadrature, the combination of means including a selecting network for deriving the amplitude modulated subcarrier components from the color television wave, said means further including apparatus for producing a reference signal having the frequency and phase of the first subcarrier, a pair of rectifying devices each having an input electrode and an output electrode, an output circuit coupled to said devices including impedance means connected from the input electrode of one of said devices to the output electrode of the other of said devices, an input circuit for said devices coupled to said apparatus for impressing said reference signal between the input electrode of one of said devices and a point of reference potential and between the output electrode of the other of said devices and said point of reference potential so as to render said devices conductive at selected intervals and cause said devices to translate to said output circuit a pair of potentials related to the amplitude of said first reference signal with said potentials cancelling in said output circuit, a further input circuit for said devices coupled to said selecting network for applying the first and second subcarrier components between the output electrode of one of said devices and said point of reference potential and between the input electrode of the other of said devices and said point of reference potential so as to cause said devices to supply a pair of potentials to said output circuit solely during the intervals when said devices are rendered conductive by said first reference signal, with said last mentioned potentials combining in said output circuit to produce an output signal corresponding to the amplitude modulation of the first subcarrier component.

3. In a color television receiver for utilizing a modulated color television wave having a first subcarrier component amplitude modulated in accordance with selected color information and a second subcarrier component amplitude modulated in accordance with different color information, said first and second subcarrier components having the same frequency and being in phase quadrature, the combination of means including a selecting network for deriving the amplitude modulated subcarrier components from the color television wave, said means furtheir including apparatus for producing a reference signal having the frequency and phase of the first subcarrier, a pair of rectifying devices each having an input electrode and an output electrode, an output circuit coupled to said devices including a pair of equal value resistors series connected from the input electrode of one of said devices to the output electrode of the other of said devices and a pair of equal value series capacitors connected across said resistors, a pair of output terminals respectively connected to the common junction of said resistors and to a point of reference potential, a balanced input circuit for said devices coupled to said apparatus for impressing a pair of phase-opposite components of said reference signal respectively between the output electrode of said one device and said point of reference potential and between said input electrode of said other device and said point of reference potential to render said devices conductive at intervals corresponding to the peaks of said reference signal and cause said devices to translate with opposite polarity to said output circuit a pair of potentials corresponding to the amplitude of such peaks to cancel in said output circuit, a further input circuit for said devices coupled to said selecting network for applying the first and second subcarrier components between the common junction of said capacitors and said point of reference potential to cause said devices to supply a pair of potentials to said output circuit with like polarity solely during the intervals when said devices are rendered conductive by the peaks of said reference signal, with said last mentioned potentials combining in said output circuit to produce an output signal corresponding to the amplitude modulation of the first subcarrier component.

4. In a color television receiver for utilizing a modulated color television wave having a first subcarrier component amplitude modulated in accordance with selected color information and a second subcarrier component amplitude modulated in accordance with different color information, said first and second subcarrier components having the same frequency and being in phase quadrature, the combination of means including a selecting network for deriving the amplitude modulated subcarrier components from the color television wave, said means further including apparatus for producing a reference signal having the frequency and phase of the first subcarrier, a pair of unilaterally conductive devices each having an anode and a cathode, a phase splitting network connected to the cathode of one of said devices and to the anode of the other of said devices and to a point of reference potential, said phase splitting network responding to a signal impressed between a terminal thereof and said point of reference potential for impressing a pair of oppositely phased signals on said devices each having an amplitude corresponding to said reference potential, a pair of capacitors series-connected from the anode of said one device to the cathode of said other device and having a common junction terminal, means for impressing the amplitude modulated subcarrier components from said selecting network between one of said terminals and said point of reference potential, means for impressing said reference signal from said apparatus between the other of said terminals and said point of reference potential, and circuit means connected across said capacitors for deriving an output signal corresponding to the amplitude modulation of the first subcarrier component.

5. In a color television receiver for utilizing a modulated color television wave having a first subcarrier component amplitude modulated in accordance with selected color information and a second subcarrier component amplitude modulated in accordance with different color information, said first and second subcarrier components having the same frequency and being in phase quadrature, the combination of means including a selecting network for deriving the amplitude modulated subcarrier components from the color television wave, said means further including apparatus for producing a sine wave referenec signal having the frequency and phase of the first subcarrier and an amplitude greater than the amplitude of the first subcarrier, a pair of unilaterally conductive devices each having an anode and a cathode, phase splitting inductance means connected to the cathode of one of said devices and to the anode of the other of said devices and having an intermediate point connected to a point of reference potential, said inductance means responding to a signal impressed between a terminal thereof and said point of reference potential for impressing a pair of oppositely phased signals on said devices each having an amplitude corersponding to said reference potential, a pair of capacitors series-connected from the anode of said one device to the cathode of said other device and having a common junction terminal, means for impressing the amplitude modulated subcarrier components from said selecting network between one of said terminals and said point of reference potential, means for impressing said reference signal from said apparatus between the other of said terminals and said point of reference potential, and a pair of resistors series-connected across said pair of capacitors and having a common junction terminal, with an output signal being derived between said terminal of said resistors and said point of reference potential, said output signal representing the amplitude modulation of the first subcarrier component and having an axis corresponding to said reference potential.

6. In a color television receiver for utilizing a modulated color television wave having a first subcarrier component amplitude modulated in accordance with selected color information and a second subcarrier component amplitude modulated with different color information, said first and second subcarrier components having the same frequency and being in phase quadrature, the combination of means including a selecting network for deriving the amplitude modulated subcarrier components from the color television wave, said means further including apparatus for producing a reference signal having the frequency and phase of the first subcarrier, a pair of unilaterally conductive devices each having an anode and a cathode, phase splitting means connected to the cathode of one of said devices and to the anode of the other of said devices and having an intermediate point connected to a point of reference potential, said phase splitting means responding to a signal impressed thereon for applying a pair of oppositely phased signals on said devices each having an amplitude corresponding to said reference potential, a pair of capacitors series connected from the anode of said one device to the cathode of said other device, means for impressing the amplitude modulated subcarrier components from said selecting network between the common junction of said capacitors and said point of reference potential, means for impressing said reference signal from said apparatus between a terminal of said phase splitting means and said point of reference potential, and a pair of resistors series connected across said pair of capacitors, with an output signal being derived between the common junction of said resistors and said point of reference potential, said output signal representing the amplitude modulation of the first subcarrier component and having an axis corresponding to said reference potential.

7. In a color television receiver for utilizing a modulated composite color television wave including a color subcarrier wave formed of a first subcarrier component amplitude modulated in accordance with selected color information and a second subcarrier component amplitude modulated in accordance with different color information, said first and second subcarrier components having the same frequency and being in phase quadrature, the combination of, means including a selecting network for deriving the amplitude modulated subcarrier components from the color television wave, and further including apparatus for producing a reference signal having the frequency and phase of the first subcarrier component, a related device, an output circuit for said device, an input circuit for said device coupled to said selecting network for applying the first and second subcarrier components to said device, a further input circuit for said device coupled to said apparatus for impressing said reference signal on said device with an effect on the conductivity thereof substantially greater than that of said sub-carrier components to cause said device to translate to said output circuit a signal related in amplitude to said reference signal and to render said device conductive to the subcarrier components only during the half cycles of said reference signal on one side of the axis thereof and for at least a portion of each such half cycle to cause said device to supply an output signal to said output circuit related to the respective amplitudes of the subcarrier components during said conductive intervals, whereby an output signal varying with the amplitude modulation of said first subcarrier component is supplied to said output circuit substantially to the exclusion of the amplitude modulation of said second subcarrier component.

8. In a color television receiver for utilizing a modulated composite color television wave including a color subcarrier wave formed of a first subcarrier component amplitude modulated in accordance with selected color information and a second subcarrier component amplitude modulated in accordance with different color information, said first and second subcarrier components having the same frequency and being in phase quadrature, the combination of, means including a selecting network for deriving the color subcarrier from the color television wave and further including apparatus for producing a first reference signal having the phase and frequency of the first subcarrier component and a second reference signal having the phase and frequency of the second subcarrier component, first and second rectifying devices each having an anode and at least one further electrode, an input circuit for said first and second devices coupled to said selecting network for applying said color subcarrier wave on the respective anodes of said devices, an input circuit connected between a further electrode of said first device and a point of reference potential for impressing said first reference signal on such further electrode thereof with an effect on the conductivity of said first device substantially greater than that of said color subcarrier wave to render said first device conductive only during the half cycles of said first reference signal on one side of the axis thereof and for at least a portion of each such half cycle with said first device being rendered conductive during intervals including the peak value of said first subcarrier component and the zero value of said second subcarrier component, an input circuit connected between a further electrode of said second device and said point of reference potential for impressing said second reference signal on such further electrode thereof with an effect on the conductivity of said second device substantially greater than that of said color subcarrier wave to render said second device conductive only during the half cycles of said second reference signal on one side of the axis thereof and for at least a portion of each such half cycle with said second device being rendered conductive during intervals including the peak value of said second subcarrier component and the zero value of said first subcarrier component, a first output circuit coupled to said first device and to said point of reference potential for deriving the amplitude modulation of said first subcarrier component, and a second output circuit coupled to said second device and to said point of reference potential for deriving the amplitude modulation of said second subcarrier component in additive relation with a signal related to said second reference signal.

9. In a color television receiver for utilizing a modulated composite color television wave including a color subcarrier wave formed of a first subcarrier component amplitude modulated in accordance with selected color information and a second subcarrier component amplitude modulated in accordance with different color information, said first and second subcarrier components having the same frequency and being in phase quadrature, the combination of means including a selecting network for deriving the color subcarrier from the color television wave, said means further including apparatus for producing a first reference signal having the phase and frequency of the first subcarrier component and at least double the amplitude thereof, and for producing a second reference signal having the phase and frequency of the second subcarrier component and at least double the amplitude thereof, a first and a second electron discharge device each including first and second electrodes between which rectifier action exists, an input circuit connected between said first electrode of said first device and a point of reference potential for impressing said first reference signal on said first electrode thereof to render said first device conductive for recurring intervals corresponding to the peaks of the half cycles of said first reference signal on one side of the axis thereof, an input circuit connected between said first electrode thereof said second device and said point of reference potential for impressing said second reference signal on said first electrode thereof to render said second device conductive only during recurring intervals corresponding to the peaks of the half cycles of said second reference signal on one side of the axis thereof, a further input circuit for said first and second devices coupled to said selecting network for applying said second electrode of each of said color subcarrier waves to said devices so that said first device is rendered conductive during intervals corresponding to the peak values of said first subcarrier component and to the zero values of said second subcarrier component and so that said second device is rendered conductive during intervals corresponding to the peak values of said second subcarrier component and to the zero values of said first subcarrier component, a first output circuit coupled to said first device and to said point of reference potential for deriving the amplitude modulation of said first subcarrier component, and a second output circuit coupled to said second device and to said point of reference potential for deriving the amplitude modulation of said second subcarrier component in additive relation with a signal related to said second reference signal.

10. In a color television receiver for utilizing a modulated composite color television wave including a color subcarrier wave formed of a first subcarrier component which is amplitude modulated in accordance with selected color information and a second subcarrier component which is amplitude modulated in accordance with color information different from the selected color information, said first and second subcarrier components having the same frequency and being in phase quadrature, the combination of, means including a selecting network for deriving the amplitude modulated subcarrier components from the color television wave, and further including apparatus for producing a reference signal having the frequency and phase of the first subcarrier component, a device having first and second electrodes between which rectifying action exists, an output circuit for said device coupled to said device and to a point of reference potential in the color television receiver, an input circuit for said device coupled to said first electrode of said device for applying the first and the second subcarrier components to said first electrode of said device, a further input circuit for said device connected to said second electrode thereof and to said point of reference potential for impressing said reference signal on said second electrode of said device with an effect on the conductivity thereof substantially greater than that of the subcarrier components to cause said device to translate to said output circuit a signal related in amplitude to said reference signal and to render said device conductive to the subcarrier components only during the half cycles of said reference signal on one side of the axis thereof and for at least a portion of each such half cycle to cause said device to supply an output signal to said output circuit related to the respective amplitudes of the subcarrier components during said conductive intervals, whereby an output signal varying with the amplitude modulation of said first subcarrier component is supplied to said output circuit substantially to the exclusion of the amplitude modulation of said second subcarrier component.

References Cited in the file of this patent

UNITED STATES PATENTS

| | | |
|---|---|---|
| Re. 23,440 | Earp | Dec. 18, 1951 |
| 2,588,094 | Eaton | Mar. 4, 1952 |